(12) United States Patent
Mignon et al.

(10) Patent No.: US 6,426,462 B1
(45) Date of Patent: Jul. 30, 2002

(54) DEVICE FOR THE CONNECTION OF A MULTIPLE-TUBE STRUCTURE AND METHOD OF ACCESS TO THIS DEVICE

(75) Inventors: Pierre Mignon, Perros Guirec; Daniel Crespel, Lannion; Yannick Schreiber, Chartres, all of (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/525,386

(22) Filed: Mar. 15, 2000

(30) Foreign Application Priority Data

Mar. 19, 1999 (FR) .............................. 99 03444
Nov. 22, 1999 (FR) .............................. 99 14670

(51) Int. Cl.$^7$ ................................ H02G 3/18
(52) U.S. Cl. ............... 174/65 R; 174/64; 174/135; 174/152 G; 138/150; 248/56; 16/2.1
(58) Field of Search ................. 174/64, 65 R, 174/65 SS, 65 G, 135, 151, 108, 86, 14 R, 13, 153 G, 152 G; 248/56; 16/2.1, 2.2; 138/121, 134, 150, 110; 285/21.3, 903, 423

(56) References Cited

U.S. PATENT DOCUMENTS

| | | | | |
|---|---|---|---|---|
| 4,029,891 A | * | 6/1977 | Nakata ...................... | 174/14 R |
| 4,051,322 A | * | 9/1977 | Park et al. ................ | 174/65 R |
| 4,288,700 A | * | 9/1981 | Grass et al. ............... | 250/523 |
| 5,222,179 A | | 6/1993 | Auteri ........................ | 385/114 |
| 5,381,501 A | | 1/1995 | Cardinal et al. ............ | 385/54 |
| 5,706,384 A | | 1/1998 | Peacock et al. ............. | 385/135 |
| 5,915,736 A | * | 6/1999 | Marik et al. ............... | 285/21.3 |

FOREIGN PATENT DOCUMENTS

| | | | |
|---|---|---|---|
| DE | 42 14 039 | 11/1993 | |
| DE | 42 26 366 | 2/1994 | |
| DE | 43 15 275 | 11/1994 | |
| DE | WO 97/26574 | 7/1997 | |
| DE | 198 01 500 | 12/1998 | |
| EP | 582 744 | 2/1994 | |
| EP | 980 012 | 2/2000 | |
| GB | 1232 834 | * 5/1971 | .............. 174/65 R |
| GB | 2 165 663 | 4/1986 | |
| GB | 2 277 812 | 11/1993 | |

OTHER PUBLICATIONS

Patent Abstract of Japan, vol. 006, No. 148, Apr. 1982 & JP 57 067907.

* cited by examiner

*Primary Examiner*—Dean A. Reichard
*Assistant Examiner*—Dhiru R Patel
(74) *Attorney, Agent, or Firm*—Nilles & Nilles SC

(57) ABSTRACT

A device for connection between the ends of tubes (2) protecting one or more cables (9) and a box (4), has a flexible sheath (3) that makes it possible, at the exit from the tubes (2), to connect the cables (9) coming from the tubes (2) to the box in providing for the protection of the said cables (9) and enabling the moving away of the box (4) to be accessed.

10 Claims, 3 Drawing Sheets

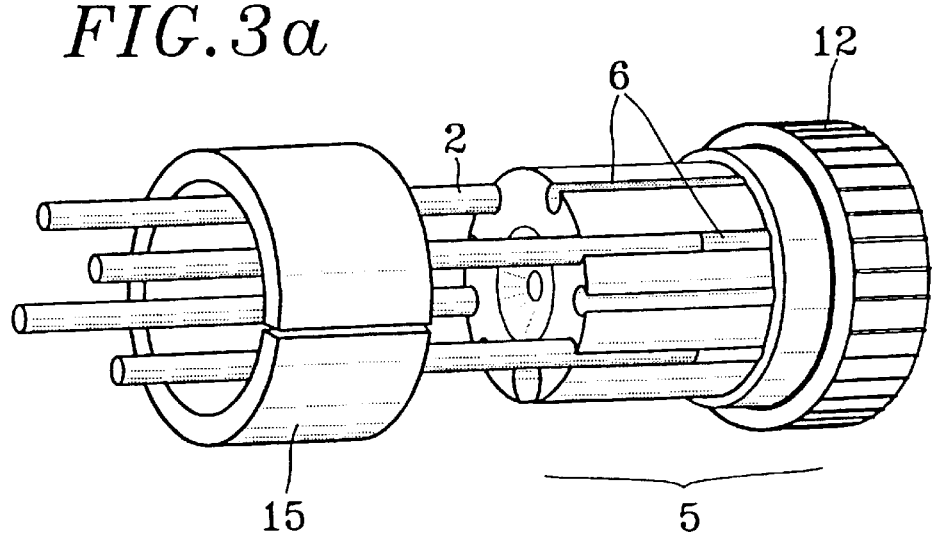
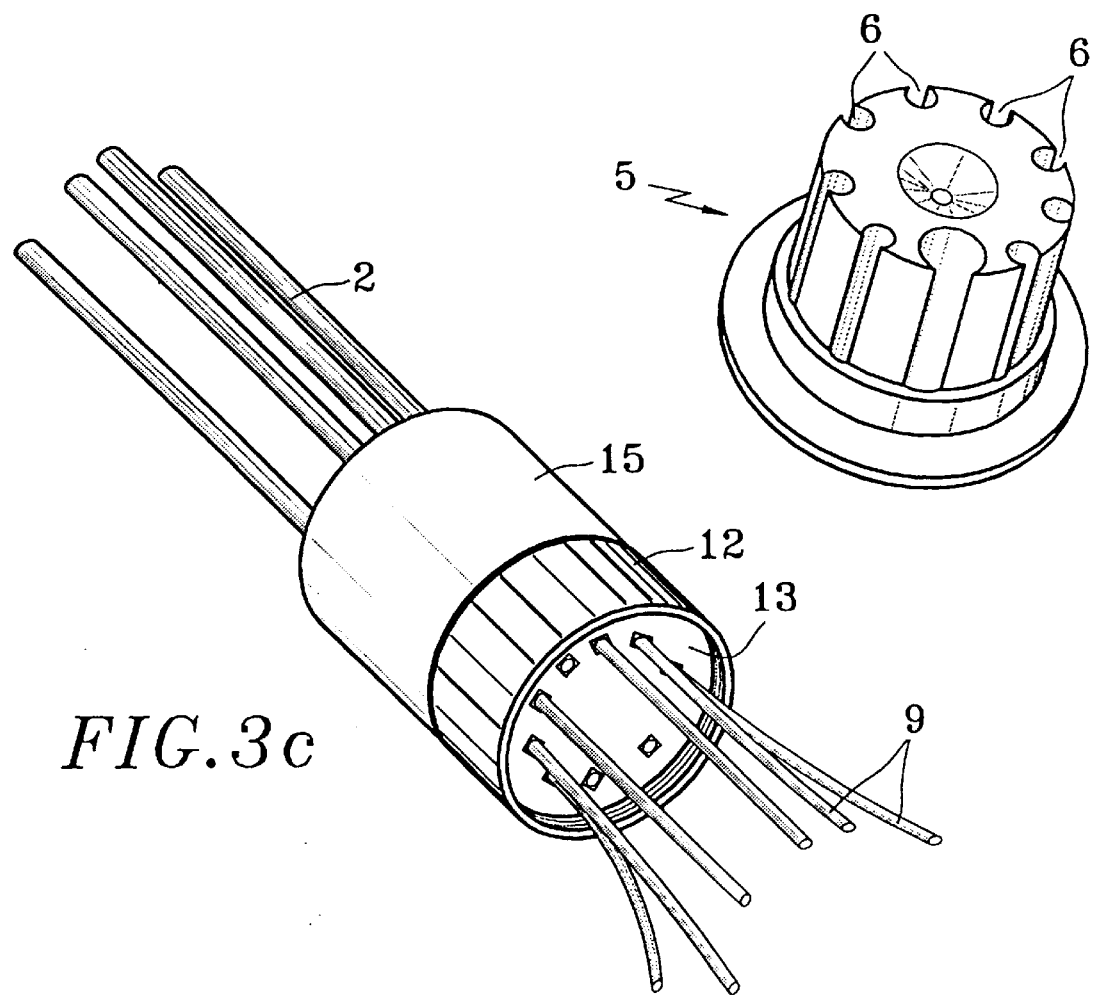

DEVICE FOR THE CONNECTION OF A MULTIPLE-TUBE STRUCTURE AND METHOD OF ACCESS TO THIS DEVICE

BACKGROUND OF THE INVENTION

Field of the Invention

The invention relates to a connection device between the ends of tubes and a box from which there emerges a plurality of cables.

The field of the invention is that of a wired network for telecommunications, power, lighting or signalling.

More particularly, a description shall be given of a wired telecommunications network that itself brings together several types of networks to which there correspond various morphologies of infrastructure. A distinction may be made between;

- interconnection networks, which connect networks of distinct telecommunications operators. The connections between these networks use underground conduits that are operated jointly.
- transmission networks belonging to one or more operators and comprising nodes called telecommunications exchanges. The transmissions are sometimes made by means of RF channels but, given the quantity, confidentiality and need to securitize the information to be transmitted, it is often preferred to use cable transmission, especially transmission by fiber-optic cables, Various types of cables are used for these transmissions: overhead cables that do not always provide a sufficient degree of security to an operator and therefore expose his infrastructure, undersea or sub-fluvial cables which are very costly to lay down and are used only in case of necessity and, finally, underground cables and cables in buildings.
- the distribution network, also called a "local loop", which indicates the part of the network located between a telecommunications exchange and the customer. In a rural environment, low population density makes it possible to optimize investments by using overhead cables, or satellite, radio or RF wireless transmission means. Conversely, in an urban environment, the population density encourages the use of underground conduits. The dimensioning of these networks varies according to the operators but the topology remains identical: a set of chambers with underground or roadway access, generally connected by underground conduits. This topology offers protection to the cables, and facilitates their installation. It also makes it possible to subsequently reach the cables or carry out work on them, depending on the development of the network which may require the dismounting of the cables. In the case of the Applicant, France Telecom, this network generally consists of cable access chambers connected by ducts with a diameter of less than 80 mm, laid out in groups over that may vary from a few meters up to 300 m.
- the private telecommunications networks that companies, local authorities and other entities set up in order to facilitate the exchange of internal information independently of the operator. This mode of exploitation makes it possible to share the resources at lower cost. In certain cases, the large number of the buildings in a company entails the making of connections external to the buildings. If these buildings are localized in the same site, then the morphology of the infrastructure may be similar to that of the distribution network described here above. If the sites are distant, then the company calls in a telecommunications operator in order to use his network. In this case, the information goes through a distribution network and then a transmission network.

Various morphologies of infrastructure may thus be considered, depending on the network considered and the approach adopted: the cables may or may not be laid in plain earth, they may or may not be buried in concrete or bitumen, laid in underground conduits or even undersea or sub-fluvial conduits, fixed to overhead supports resting on posts, walls, etc. The underground infrastructure is currently the most frequently used approach. The invention generally applies to any infrastructure and more particularly to an underground infrastructure.

Hereinafter, we shall recall a certain number of definitions which will make it possible to understand and locate the field of the invention more clearly.

In the present invention, the term<<leads>>shall be understood to mean both copper wires for telephone transmission and elements in which light can be propagated such as optical fibers. These optical fiber elements may be filamentary and assembled in elements in ribbon form often known as ribbon cables. The term<<leads>>may also designate filamentary elements or elements in the form of electrically conductive strips, made especially of metal wire, for example copper.

The term<<cable>>is understood to mean the unit constituted by one or more leads protected by a sheath or jacket. In the literature, a<<cable>>is sometimes called a lead.

2. Description of the Prior Art

There are several cable structures in existence. Among the optical cables, we may refer to the cable comprising a group of 4 to 10 modules with 6 to 24 optical fibers, the diameter of this type of cable reaching up to 18 mm, and the microcable possibly containing up to 24 optical fibers gathered, as the case may be, in modules whose diameter varies between 1,5 to 6,5 mm, which corresponds to a reduction in diameter by a factor of 3.

As indicated in FIG. 1b), in certain cases, the cables 9 are laid freely in the ducts 14. In other cases, they are sheltered by one or more tubes 2 having a rigidity greater than that of cables 9. The reduction in costs associated with the miniaturization of the diameters of the cables makes it possible to envisage the laying of a plurality of small tubes in the ducts. In the distribution networks, the diameter of these tubes varies from 5 to 18 mm and they are made out of materials like polyvinyl chloride (PVC), polyethylene (EP) and polypropylene (PP).

The term<<cable access chamber>>or<<junction chamber>>is understood to mean a space into which the cables or the tubes lead or from which they leave. These cable access chambers can be prefabricated or built on the spot. They are often placed laid beneath the sidewalk and are made of reinforced concrete. In these cable access chambers, the cables are often connected to boxes.

The term<<box>>is understood to mean an element that facilitates and protects the connection of the leads and the cables. There are mainly two types of boxes. The in-line box is characterized by an entry and exit of cables on opposite sides of the box. When all the cables enter and exit on the same side, it is called a splice box. These boxes are tightly sealed, shield the leads and the connections and facilitate subsequent work.

The rigidity of the tubes, which are made for example of PVC, favors laying a tube in plain earth, or burying it concrete, or placing it in ducts and ensures that the dimensional specifications of the tube will be maintained. In the concept of miniaturization of the diameters of the cables and tubes, the small-sized tubes are flexible enough to reach the box directly instead of cables: extra lengths of tubes may then be stowed and, if necessary, coiled in the cable access chamber pending subsequent work. However, the increase in the stiffness and number of these tubes and the management of the extra lengths causes the cable access chambers to be encumbered. This does not facilitate work. In other cases, the tubes are cut at the entrance to the cable access chamber or a little after it, thus releasing the cables, which are more flexible than the tubes. However, if the flexibility of the cables improves the ergonomic quality of subsequent operations, the cables, thus released from the tubes or tubes, travel unprotected up to the box and are thus vulnerable.

The present invention makes it possible to overcome these disadvantages by proposing a connection device to a box of cables coming from tubes, ensuring the transition between tubes and cables and the protection of the cables up to the box. It thus facilitates the removal of a box from the cable access chamber or the shifting of this box while making it possible to store large extra lengths of protected cables, without being handicapped by the rigidity of the tubes, and generally, making it very easy to carry out operations of verification and repair.

SUMMARY OF THE INVENTION

In the device for connection between the ends of tubes protecting one or more cables and a box, a flexible sheath makes it possible, at the output of the tubes, to connect the cables coming from the tubes to the tubes to the box, in protecting them and enabling the shifting of the box that is to be accessed.

The flexible sheath advantageously comprises a pipe with an extruded or helically folded envelope and could include a connecting piece at each of its ends to provide for assembly or disassembly.

According to another characteristic, the device comprises a collector of tubes to assemble the ends of the tubes. Moreover, the collector is capable of including means to ensure the tightly sealed passage of the cables. These means advantageously comprise an elastomer membrane.

According to another characteristic, the collector is connected to the sheath. The collector possibly comprises ducts to hold the tubes in position.

The ducts may be located on the periphery of the collector.

To facilitate the passage of the cables from the collector to the sheath, the device comprises a transition element located between the collector and the sheath.

An object of the invention is also a method of access to cables arriving at a box located in a cable access chamber, consisting in placing said cables in a flexible sheath of a length sufficient to be able to shift the box to be reached.

BRIEF DESCRIPTION OF THE DRAWINGS

Other features and advantages of the invention will appear more clearly from the following description given by way of a non-restrictive example with reference to the appended drawings, of which:

FIG. 3a) shows a view in profile of the collector according to the invention,

FIG. 3b) is a drawing of the collector,

FIG. 3c) shows a view in perspective of the collector.

MORE DETAILED DESCRIPTION

Figure 1A:
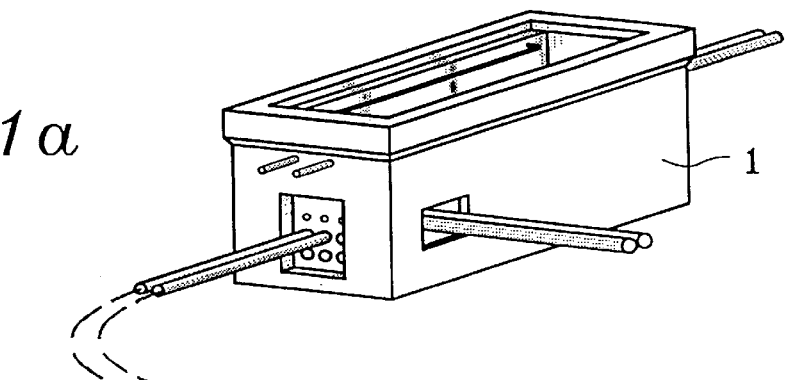
FIG. 1a) represents a diagrammatic view of an underground infrastructure.

The underground infrastructure shown in FIG. 1a) is made up of cable access chambers 1 connected to one another by ducts 14. These ducts 14 reach the front of a cable access chamber 1 at the level of a mask. The cable access chambers 1 may comprise several masks.

Figure 1B:
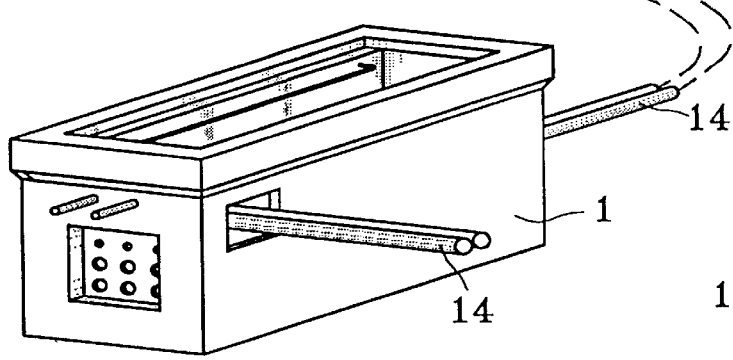
FIG. 1b) shows a sectional view of a duct.
Figure 1B:
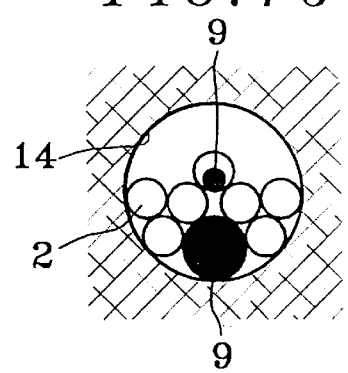

FIG. 1b), which has already been described, provides an exemplary illustration of a duct 14 containing a large cable 9, with tubes 2 protecting smaller cables 9. A duct 14 may also contain minitubes that protect microcables or it may contain only one of these elements.

Figure 1C:
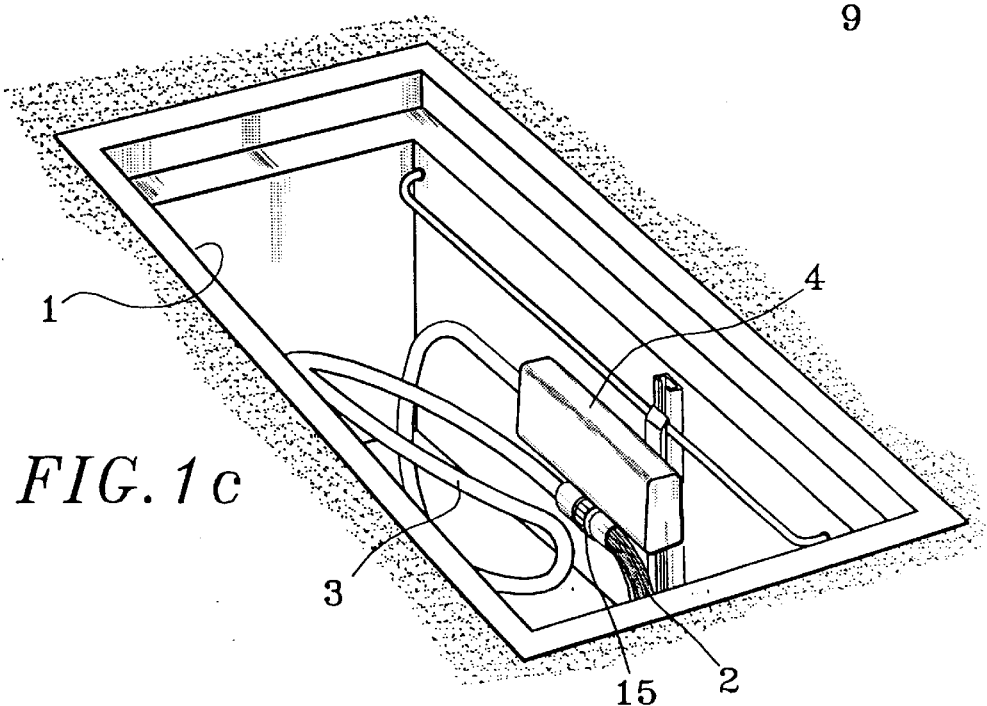
FIG. 1c) shows a top view of a cable access chamber.

FIG. 1c) shows a cable access chamber 1 in which a flexible sheath 3 provides a connection, to a box 4, for the cables coming from the tubes 2 reaching the cable access chamber 1. The cables are thus assembled at the exit of the tubes 2 and protected throughout their route to the box 4. In this FIG. 1c), the cables are concealed by the tubes 2 or the sheath 3. The flexible sheath 3, into which there pass all or a part of the cables coming from the tubes 2, can adapt to any shape and volume of chamber unlike the rigid tubes 2. This sheath 3 may be a pipe with an extruded or helically folded envelope and thus show flexibility and high crushing strength, torsional strength, flectional resistance and tensile strength. In addition to this mechanical protection, this sheath also provides protection against vandalism, pollution, rodents and the entry of dust, water or mud. For example, a pipe with an extruded or helically folded envelope having a diameter of 20 mm. may contain ten cables 9 such as optical fiber cables. This length of this flexible sheath 3 may go up to a few meters or even much more in certain configurations. Thus, the box 4 can be moved away and operated or made secure at a distance from the tubes 2, if necessary outside the cable access chamber 1, on a post, on the frontage of a building or in to any other condition of connection of the tubes 2.

Figure 2:
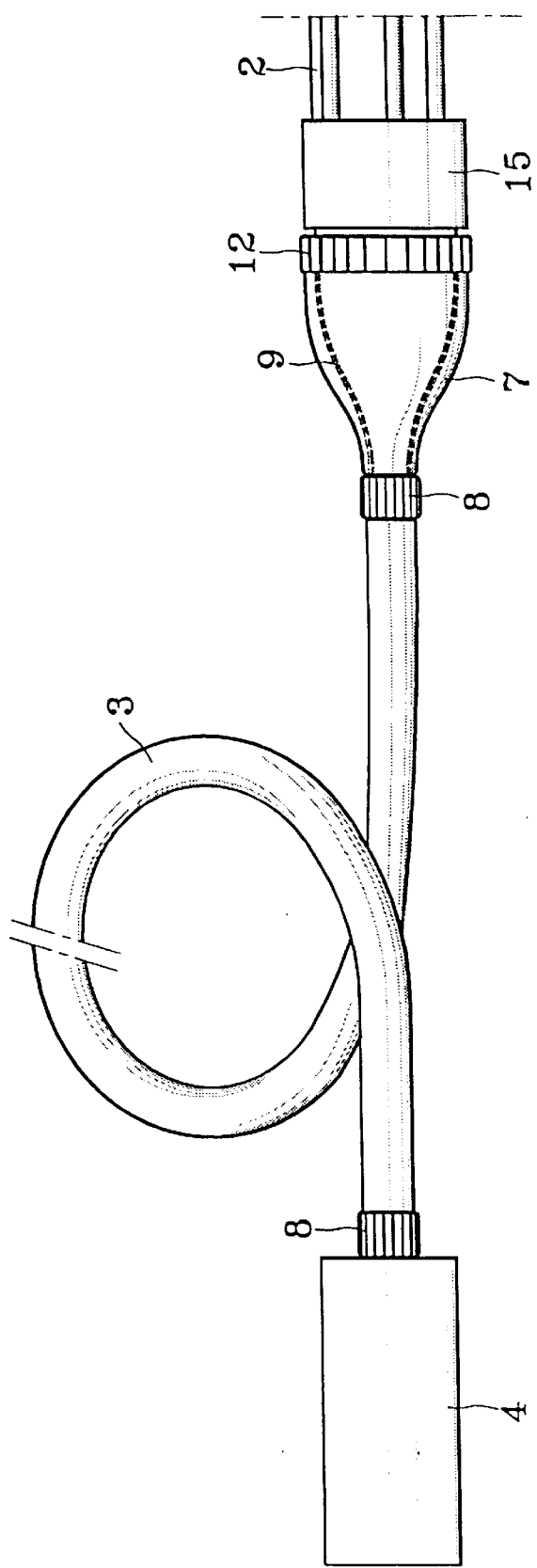
FIG. 2 shows a diagrammatic view of the connection device.

In the connection device between the end of tubes 2 and a box 4 sheltering at least two cables 9, namely the device shown in FIG. 2, at output of the box 4, the cables 9 pass into one and the same flexible sheath 3 and, surrounded by this sheath 3, they go into the end of tubes 2 from which they come out sheathed respectively by tubes 2 that are less flexible than the cables 9.

According to this FIG. 2, the ends of the tubes 2 reaching the cable access chamber 1 are assembled by the collector 5 which may possibly itself be fixed in a zone of the cable access chamber 1 by a support or any other fastening element 15 shown in FIGS. 3a) and 3c). The collector 5 is connected by a nut 12 to a transition element 7 that is itself connected to the flexible sheath 3 by a connection 8. This transition element 7, which has a truncated shape for example, enables the cables 9 to be very easily inserted into the sheath 3 through the funnel effect.

The connector elements 8 placed at each end of the flexible sheath 3 make it possible to assemble or disassemble the sheath 3. These connector elements may be nuts.

The collector 5 is shown in FIGS. 3a), 3b), 3c). The collector 5 may be constituted simply by the clamp 15. According to a preferred embodiment shown in FIG. 3a), the collector 5 comprises ducts 6 shown in FIG. 3b) into which the tubes 2 are introduced. Their holding can be reinforced by bonding for example. The ducts 6 may be opened partially over their length as shown in FIG. 3b); the holding of the tubes 2 can then be reinforced by the clamp 15 or any other tightening element. The ducts 6 may have different diameters and the collector 5 may hold tubes of different diameters, for example eight tubes with a diameter of 8 mm. and one tube with a diameter of 14 mm. The ends of the tubes 2 reach the collector 5 thus releasing the cables 9 on the front face side of the collector 5. Certain tubes 2 may be positioned in a state pending the laying of the cables 9, while others may shelter one or more of these cables. In order to avoid the introduction of dust, water or mud on the front part of the collector 5, a means 13 providing for a tightly sealed passage of the cables 9 from the tubes 2 is placed at the end of the collector 5 on its front face as indicated on FIG. 3c). This means 13 can be placed on the front face of the clamp 15 if this structure of the collector 5 has been chosen. This means 13 may comprise an elastomer membrane that can be easily cut, removed or perforated with a punch or directly with the cables 9. The thickness of this membrane may vary to the point where it is a bulky element. According to one alternative of the invention, means to maintain the tight sealing of the cables 9 are placed at every passage, from one element to another, that comes into play between the collector 5 and the box 4.

What is claimed is:

1. A device for connection between the ends of tubes protecting one or more cables and a box, comprising:
    a flexible sheath configured, at the exit from tubes, to connect cables coming from the tubes to a box in providing for the protection of said cables and enabling the moving away of the box to be accessed, wherein the flexible sheath has ends;
    at least one connection element coupled to the ends of the flexible sheath; and
    a collector element coupled after the at least one connection element, wherein the collector element has one end for receiving and guiding the tubes and one end for exiting the cables coming from the tubes, and wherein the collector element includes means to ensure a tightly sealed passage of the cables.

2. A device according to claim 1, wherein the flexible sheath comprises a pipe with a helically folded envelope.

3. A device according to claim 1, wherein the flexible sheath comprises a connection at its ends to provide for assembly or disassembly.

4. A device according to claim 1, wherein the at least one connection is configured to provide for assembly or disassembly.

5. A device according to claim 4, wherein the collector is connected to the sheath.

6. A device according to claim 4, wherein the collector element comprises ducts for the tubes.

7. A device according to claim 6, wherein the ducts are located on the periphery of the collector.

8. A device according to claim 4, comprising a transition piece with a funnel effect located between the collector and the sheath.

9. A device according to claim 1, wherein the means to ensure a tightly sealed passage of the cables comprise an elastomer membrane.

10. A method of access to cables reaching a box located in a cable access chamber, comprising: placing said cables in a flexible sheath having ends including a connection element which includes a collector element configured to provide for a tightly sealed passage of the cables, wherein the collector element has one end for receiving and guiding the tubes and one end for exiting the cables coming from the tubes; and placing said cables in a length sufficient to enable the moving away of the box to be reached.

* * * * *